(12) United States Patent
Zuercher et al.

(10) Patent No.: US 7,068,045 B2
(45) Date of Patent: Jun. 27, 2006

(54) APPARATUS AND METHOD FOR REAL TIME DETERMINATION OF ARC FAULT ENERGY, LOCATION AND TYPE

(75) Inventors: Joseph C. Zuercher, Brookfield, WI (US); David L. McClanahan, Greenfield, WI (US)

(73) Assignee: Gaton Corporation, Cleveland, OH (US)

( * ) Notice: Subject to any disclaimer, the term of this patent is extended or adjusted under 35 U.S.C. 154(b) by 44 days.

(21) Appl. No.: 10/627,016

(22) Filed: Jul. 25, 2003

(65) Prior Publication Data

US 2005/0017731 A1    Jan. 27, 2005

(51) Int. Cl.
    *G01R 31/08*    (2006.01)
(52) U.S. Cl. ...................... 324/536; 324/512
(58) Field of Classification Search ............... 324/509, 324/512, 522, 536; 361/42, 63, 79
    See application file for complete search history.

(56) References Cited

U.S. PATENT DOCUMENTS

| | | | |
|---|---|---|---|
| 4,144,487 A | 3/1979 | Pharney | |
| 4,441,073 A | 4/1984 | Davis | |
| 5,726,577 A | 3/1998 | Engel et al. | |
| 5,963,405 A | 10/1999 | Engel et al. | |
| 5,963,406 A | 10/1999 | Neiger et al. | |
| 5,986,860 A * | 11/1999 | Scott | 361/42 |
| 5,995,588 A | 11/1999 | Crick | |
| 6,088,205 A | 7/2000 | Neiger et al. | |
| 6,128,169 A | 10/2000 | Neiger et al. | |
| 6,522,509 B1 | 2/2003 | Engel et al. | |
| 6,525,918 B1 * | 2/2003 | Alles et al. | 361/93.1 |
| 6,654,219 B1 * | 11/2003 | Romano et al. | 361/78 |
| 6,703,842 B1 * | 3/2004 | Itimura et al. | 324/544 |
| 6,736,944 B1 * | 5/2004 | Buda | 204/192.13 |
| 6,782,329 B1 * | 8/2004 | Scott | 702/58 |

OTHER PUBLICATIONS

Joseph C. Zuercher, et al., "Method for Realistic Evaluation of Arc Fault Detection Performance", Chicago Intertech Conferernce, Sep., 2001, 7 pp.

* cited by examiner

*Primary Examiner*—Walter Benson
(74) *Attorney, Agent, or Firm*—Marvin L. Union

(57) ABSTRACT

A detection module and remote load voltage sensor determine a location of a parallel arc for a power circuit between a power source and a load in real time. The detection module provides a value of voltage from the power source. A current sensor measures a value of current flowing in the power circuit to or from the power source. The remote load voltage sensor measures a value of voltage at the load. A microprocessor determines the parallel arc location from the value of voltage from the power source, the value of current, the value of voltage at the load, and a wire resistance or conductance per unit length of the power circuit. In one case, connector resistance is accounted for. In another case, the load voltage is encoded at a predetermined frequency using a switched precision resistor near the load, thereby providing a power line carrier type communication.

31 Claims, 6 Drawing Sheets

US 7,068,045 B2

APPARATUS AND METHOD FOR REAL TIME DETERMINATION OF ARC FAULT ENERGY, LOCATION AND TYPE

CROSS-REFERENCE TO RELATED APPLICATION

This application is related to commonly assigned, concurrently filed U.S. patent application Ser. No. 10/341,483, filed Jan. 13, 2003, entitled "Arc Fault Detector And Method For Locating An Arc Fault".

BACKGROUND OF THE INVENTION

1. Field of the Invention

This invention relates to apparatus for detecting faults and, more particularly, to electronic detectors for detecting, locating and identifying arc faults and fault energy in a power circuit. The invention also relates to methods for detecting, locating and identifying arc faults and fault energy in a power circuit.

2. Background of the Invention

Traditional protection devices, such as circuit breakers, are described with trip curves (e.g., usually semi-logarithmic representations of current versus time (log)). In the case of a thermo-magnetic circuit breaker, both a thermal element (e.g., responding to relatively lower currents analogous to $I^2R$ heating of the power circuit wiring) and an instantaneous magnetic element (e.g., typically responding to a suitable factor above rated current, such as, for example, about 200 A for a 20 A current rating) are combined. Fuses respond analogous to heating of wiring.

Arc faults can occur, for instance, between adjacent bared conductors, between exposed ends of broken conductors, at a faulty connection, and in other situations where conducting elements are in close proximity.

Arc faults in systems can be intermittent as the magnetic repulsion forces generated by the arc current force the conductors apart to extinguish the arc. Mechanical forces then bring the conductors together again so that another arc is struck.

Arc faults in electrical systems are of two types: parallel arcs and series arcs. Parallel arc faults (or sputtering arcs) are line-to-line faults or line-to-ground faults which can occur, for instance, when the insulation on the conductors becomes frayed or is penetrated. Such parallel arc faults can draw considerable instantaneous current that is well above the rated value. However, such arc faults, by virtue of the arc voltage and available current, draw arc current that is below the instantaneous or magnetic trip thresholds of protection in a typical circuit breaker. Also, the intermittent nature of an arc fault can create an average RMS current value which is below the thermal threshold for the circuit breaker.

Series arc faults, on the other hand, occur in a single conductor path, such as, for instance, where a conductor has been cut, or at a loose or poor connection. The current in a series arc depends upon the load and is usually less than the current without the arc. A minimum arc current is typically about 0.5 A.

In parallel arc detection, the integration of activity above a threshold can involve a function of power or current, in order to provide relatively faster response for large amplitude arc currents, while avoiding false trips caused by known loads. For example, a trip signal is generated as a function of accumulated, time attenuated magnitude of step increases in current associated with each striking of the arc current. In this case, arc voltage is basically not considered, thereby preventing calculation of energy. See, for example, U.S. Pat. No. 5,963,405.

U.S. Pat. No. 6,522,509 discloses an arc fault detector suitable for aircraft AC electrical systems or other AC systems operating at higher frequencies, such as 400 Hz. The arc fault detector generates a cumulative sum of amounts by which the AC current in each most recent cyclic interval exceeds the current in the immediately preceding half cycle in absolute magnitude. An arc fault indication is generated when a time attenuated value of this cumulative sum reaches a selected level. This also is a form of signature recognition which, once again, does not quantitatively account for arc energy.

Series arcs in an AC circuit are discriminated from other phenomenon by analyzing the timing between pulses in a second derivative of the current signal. A first timer starts timing upon detection of a first pulse in the second derivative of current signal. Time out of the first timer starts a second timer which times a second interval or window during which a series arc fault will generate a second pulse of opposite polarity to the first pulse. Detection of the first pulse followed by a second pulse of opposite polarity during the window sets a flip-flop to record the event. When a predetermined number of events are counted by a counter within a given time-period set by a third timer, an output signal indicating an arc fault is generated. If the second pulse is generated before the window opens, or a third pulse occurs during the window, the flip-flop cannot be set so that other events such as the switching of a dimmer do not generate a false output signal. See U.S. Pat. No. 5,726,577.

U.S. patent application Ser. No. 10/341,483 discloses the determination of parallel arc location while presuming a known relationship between arc voltage and current. Thus, arc location is determined from measured peak current and the presumed voltage drop from source to arc, knowing the resistivity of the intermediate wiring. Unfortunately, arc voltage is a function of material and gap as well as current. Hence, arc voltage is indeterminate. Also, the peak current is believed to be inconsistent, particularly in low voltage DC systems fed from a battery, due principally to the resistance introduced by the battery itself.

It is known to employ a plurality of distributed sensors to determine the type of arc fault (series or parallel) and to isolate the fault to a zone (between sensors). See, for example, U.S. Pat. No. 5,986,860. However, this requires a plethora of voltage and current sensors and a real time data collection scheme. In this case, the accuracy of any location calculation depends on the number of sensors.

In general, both aerospace and residential applications require a strategy for addressing fault remediation after detection, which becomes problematic due to relatively long conduit runs (e.g., behind walls or fuselages). If the fault results in an open or a short circuit, then the determination of location is straightforward using RF tracing techniques. More often, however, arcing is sporadic and leaves little electrical evidence (as contrasted with physical evidence) of the fault. Arcing may be induced through motion and vibration of marginal wiring and wiring bundles that would, otherwise, be considered "normal".

In the case of 42 VDC arc faults (e.g., in planned future production automobiles), cost pressures and performance requirements motivate the development of a correlation between arc fault energy and damage to nearby materials and systems. Hence, for maximum effectiveness, trip times should be related to accumulated fault energy just as prior protection devices relate, in some manner, trip curves to material damage/flammability studies.

Accordingly, there is room for improvement in apparatus and methods for determining arc fault energy, location and type.

SUMMARY OF THE INVENTION

These needs and others are met by the present invention which employs two sensors for source current and load voltage to determine both arc fault energy (for setting trip curve characteristics) and arc location (for remediation of the fault) in a manner more direct than known prior methods. The source voltage may be predetermined (e.g., known, as in the case of a reliable source that is suitably "stiff"), or precalculated (e.g., if internal source resistance and circuit current are known) or, preferably, a source voltage sensor may be employed.

Intermittent arcing has been the bane of after the fact detection techniques (e.g., employing time domain reflectometers (TDRs)). Hence, it is believed that it is only possible to reliably determine fault location during the fault itself (i.e., in real time or through the use of real time data).

As one aspect of the invention, an apparatus for determining arc fault energy in real time for a power circuit between a power source and a load comprises: means for determining a value of voltage at the load; means for determining a value of current flowing in the power circuit to or from the power source; and means for determining a value of the arc fault energy from the value of voltage and the value of current.

The means for determining a value of the arc fault energy may include means for determining a value of parallel arc power from the value of voltage at the load times the value of current, and means for determining the value of the arc fault energy as a function of an integral of the parallel arc power (e.g., a simple time integral).

The means for determining a value of the arc fault energy may include means for determining a value of series arc power from the value of current times a difference of the value of voltage at the power source less the value of voltage at the load; and means for determining the value of the arc fault energy as a function of an integral of the series arc power. The means for determining the value of the arc fault energy as a function of an integral of the parallel arc power preferably includes means for time-decrementing the integral with a constant or proportional decay rate.

The means for determining a value of voltage at the load may include means for remotely communicating the value of voltage at the load to the means for determining a value of the arc fault energy.

The means for determining a value of voltage at the load may include means for AC modulating the current flowing in the power circuit at the load, and means for demodulating the AC modulated current.

As another aspect of the invention, a method for determining arc fault energy in real time for a power circuit between a power source and a load comprises: determining a value of voltage at the load; determining a value of current flowing in the power circuit to or from the power source; and determining a value of the arc fault energy from the value of the voltage and the value of the current.

As another aspect of the invention, an apparatus for determining a location of a parallel arc for a power circuit between a power source and a load in real time comprises: means for providing a value of voltage from the power source; means for measuring a value of current flowing in the power circuit to or from the power source; means for measuring a value of voltage at the load; and means for determining the location from the value of voltage from the power source, the value of current, the value of voltage at the load, and a wire resistance per unit length or a wire conductance per unit length of the power circuit.

The means for determining the location may include a processor determining the location from a difference of the value of voltage from the power source less the value of voltage at the load, the difference being divided by the value of current and being divided by the wire resistance per unit length.

The means for determining the location may include means for adjusting the location based upon a resistance of connectors in the power circuit.

As another aspect of the invention, a method for determining parallel arc location in real time for a power circuit between a power source and a load comprises: providing a value of voltage from the power source; measuring a value of current flowing in the power circuit to or from the power source; measuring a value of voltage at the load; and determining the parallel arc location from the value of voltage from the power source, the value of current, the value of voltage at the load, and a wire resistance per unit length or a wire conductance per unit length of the power circuit.

As another aspect of the invention, an apparatus for distinguishing a parallel arc from a series arc for a power circuit between a power source and a load comprises: means for providing a nominal value of current flowing in the power circuit between the power source and the load; means for providing a measured value of current flowing in the power circuit to or from the power source; and means for identifying the parallel arc when the measured value of current is greater than the nominal value of current, and for identifying the series arc when the measured value of current is less than the nominal value of current.

The means for identifying may include means for determining arc fault energy of the parallel arc or of the series arc. The means for identifying may include means for determining location of the parallel arc.

As another aspect of the invention, a method for distinguishing a parallel arc from a series arc for a power circuit between a power source and a load comprises: providing a nominal value of current flowing in the power circuit between the power source and the load; providing a measured value of current flowing in the power circuit to or from the power source; and identifying the parallel arc when the measured value of current is greater than the nominal value of current, and alternatively identifying the series arc when the measured value of current is less than the nominal value of current.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Although power control modules, protection modules, detection modules and circuit breakers are disclosed herein, the invention is applicable to a wide range of apparatus, circuit interrupters, contactors, circuit breakers and circuit breaker systems for residential, aircraft, aerospace, industrial, commercial, vehicular and other applications involving either DC or AC systems.

Figure 1:
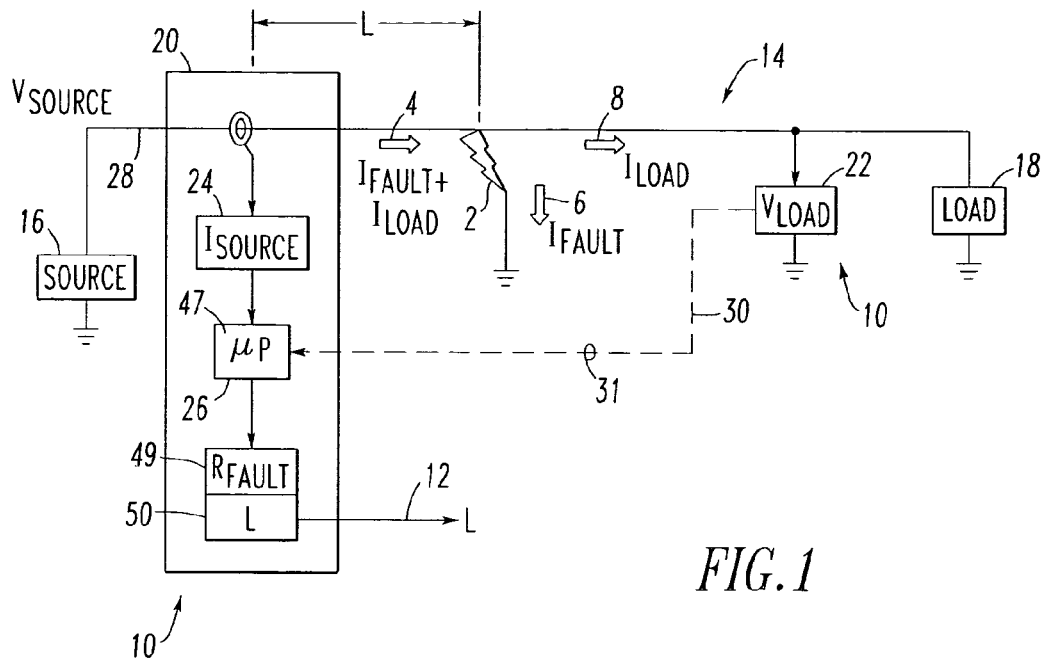
FIG. 1 is a block diagram in schematic form of an apparatus for detecting and locating a parallel arc fault in a power circuit in accordance with the present invention.
Figure 2:
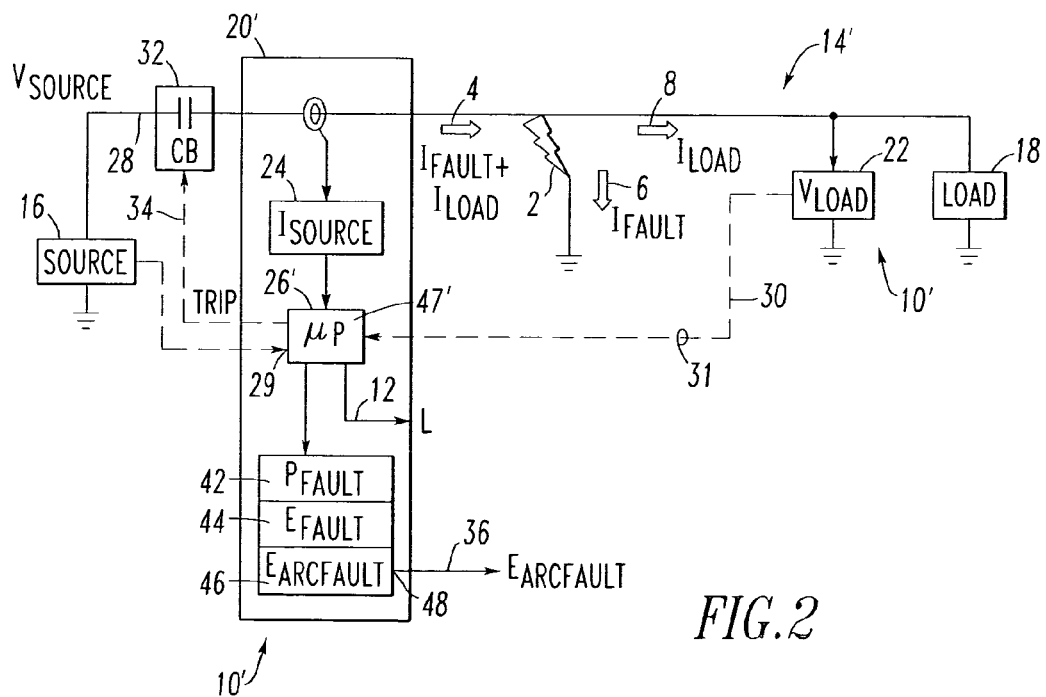
FIG. 2 is a block diagram in schematic form of an apparatus for detecting and locating a parallel arc fault in a power circuit in accordance with another embodiment of the present invention.

As shown in FIG. 1, for parallel arc faults, such as 2, the upstream source current 4, $I_{SOURCE}$, consists of the fault current 6, $I_{FAULT}$, plus the load current 8, $I_{LOAD}$, which is approximated by the fault current 6 (and which is typically much greater than the load current 8). An apparatus 10 determines the location (L) 12 of the parallel arc 2 for a power circuit 14 between a power source 16 and a load 18 in real time. The apparatus 10 includes a detection module 20 and a remote load voltage sensor 22, which measures a value of voltage, $V_{LOAD}$, at the load 18. The detection module 20 includes a source current sensor 24, which measures a value of the source current 4 flowing in the power circuit 14 to or from the power source 16 (e.g., an AC or DC power source), and a suitable processor, such as microprocessor (μP) 26. In the embodiment of FIG. 1, the μP 26 is preprogrammed with knowledge of the rated value of the voltage 28, $V_{SOURCE}$, from the power source 16. Alternatively, as shown in FIG. 2, the μP 26' includes a voltage sensor 29 (e.g., an internal or external analog-to-digital converter (not shown)), which measures a value of voltage, $V_{SOURCE}$, at the power source 16.

Alternatively, the value of the source voltage 28 can be calculated from the source nominal open circuit voltage ($V_{SOURCEOPENCIRCUIT}$), source internal resistance ($R_{INT}$) and source current 4 ($I_{SOURCE}$) by $V_{SOURCE} = V_{SOURCEOPENCIRCUIT} - I_{SOURCE} \times R_{INT}$.

In accordance with the present invention, the μP 26 determines the location (L) 12 of the parallel arc fault 2 with respect to the source 16 from: the source voltage 28, $V_{SOURCE}$, from the power source 16; the source current 4, $I_{SOURCE}$; the load voltage 30, $V_{LOAD}$, at the load 18 from the remote voltage sensor 22; and a preprogrammed wire resistance per unit length or a wire conductance per unit length of the power circuit 14. As discussed below, the remote voltage sensor 22 employs a suitable communication circuit, such as a wireless (e.g., RF; infrared) channel 31, for remotely communicating the value of the load voltage 30, $V_{LOAD}$, to the μP 26.

It is also possible to correct for connector resistance, if known (e.g., predetermined), by simply subtracting the known resistance value times the measured current from the applied voltage when considering conductor voltage drops, as is discussed below in connection with Equation 4A.

The upstream current sensor 24 for the source current 4, $I_{SOURCE}$, may be a suitable shunt (e.g., a sensing resistor or other suitable impedance in series with the power circuit 14) or a non-contact based device, such as a Hall sensor, as is well known in the art. These current sensors may be employed for both DC and AC applications. Further, for AC applications, a suitable coil (e.g., a relatively low impedance current transformer; a relatively high impedance sensing coil employing a dφ/dt mode) may be employed, as is well known in the art.

The downstream load voltage 30, $V_{LOAD}$, suitably represents the arc voltage of the parallel arc fault 2, with only a relatively small error due to the ohmic drop in that part of the power circuit 14 from the fault 2 to the load 18. Any suitable voltage sensor may be employed. For example, the voltage sensor 22 may be any suitable contact sensor with suitable electronics to communicate the sensed voltage signal 30 via conventional power line carrier (PLC) (FIG. 4), wireless (FIG. 1), any suitable separate communication bus or channel (FIG. 5), or any conventional communication method. Alternatively, any suitable non-contact sensor may be employed, such as a coaxial device, which employs suitably high impedance coupling and, for example, operates as a capacitive pickup for AC applications.

Preferably, the sensed parameters are instantaneous relative to any response time of interest, which would typically not be an average or RMS value typical of other protection devices, but would be more analogous to magnetic trip operation (e.g., in the order of milliseconds, or a subcycle of the drive frequency). The communication speed is most preferably on the same order or faster than this response time of interest, in order to achieve real time operation. It is important to note that the communication response time includes acquisition, transmission, and decoding times, including any system time delays.

Alternatively, it is possible to calculate power delayed in real time (by an amount consistent with speed of response needs) by time stamping or relative-delay stamping the information, in order that the proper voltage may be multiplied by the proper current measurement.

As shown in FIG. 2, an apparatus 10' includes a protection module 20' and the remote load voltage sensor 22. The apparatus 10' is applied in a power circuit 14' along with a conventional circuit breaker 32. Although the source voltage sensor 29 is employed, the μP 26' may be preprogrammed with knowledge of the rated value of the voltage 28, $V_{SOURCE}$, from the power source 16. The μP 26' functions in a similar manner as the μP 26 of FIG. 1, in order to determine the location (L) 12 of the parallel arc fault 2. In addition, the μP 26' provides a TRIP signal 34 to the circuit breaker 32 whenever a determined value of arc fault energy 36, $E_{ARCFAULT}$, exceeds a predetermined threshold value. Typically, this energy occurs within a specific predetermined time window (which is equivalent to having an average power be sustained for a specific time duration) after which a reset to zero occurs; or the value is time decremented using either a linear decay or a proportional decay (e.g., analogous to a cooling rate). It is also possible to provide a sliding window. As one example, the system may require 100 J (Watt-sec) to be accumulated within a 50 ms windowed time period, otherwise a reset occurs and the process repeats.

Figure 3:
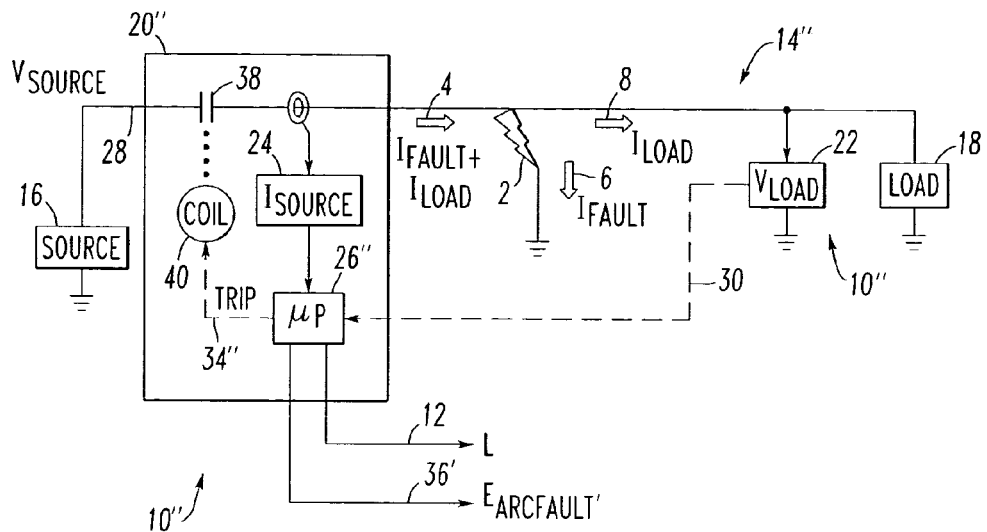
FIG. 3 is a block diagram in schematic form of an apparatus for detecting and locating a parallel arc fault in a power circuit in accordance with another embodiment of the present invention.

Referring to FIG. 3, an apparatus 10" includes a circuit breaker 20 and the remote load voltage sensor 22. The circuit breaker 20" is applied in a power circuit 14" with separable contacts 38 to disconnect the load 18 from the power source 16 in response to a trip coil 40 or operating mechanism. The μP 26" functions in a similar manner as the μP 26' of FIG. 2, in order to determine the location (L) 12 of the parallel arc fault 2, and to provide the TRIP signal 34" to the trip coil 40 whenever a determined value of arc fault energy 36', $E_{ARCFAULT}'$, exceeds a predetermined threshold value. Here, the circuit breaker 20" includes the current sensor 24 and obtains voltage information 30, in real time, from the remote load voltage sensor 22. In turn, the circuit breaker 20" logs the fault location 12 and the arc fault energy 36', and clears the power circuit 14", as appropriate. Alternatively, a suitable threshold value may be compared with the accumulated arc fault energy 36', $E_{ARCFAULT}'$, in order to determine if a suitable warning or alarm (not shown) is provided.

Equations 1 and 2, below, determine arc fault power, $P_{FAULT}$, and arc fault energy, $E_{FAULT}$, respectively, where $V_{LOAD}$ approximates the arc voltage of the parallel arc 2:

$$P_{FAULT} = I_{SOURCE(t)} \times V_{LOAD(t)} \quad \text{(Eq. 1)}$$

As mentioned above, the current and voltage are preferably paired in real time or synchronized in delayed time in order to achieve a meaningful result.

$$E_{FAULT} = \int P_{FAULT} dt \quad \text{(Eq. 2)}$$

As shown in Equation 3, a suitable decay rate, $P_{DECAY}$, may be applied in the determination of parallel arc activity, as expressed by the accumulated arc fault energy, $E_{ARCFAULT}$:

$$E_{ARCFAULT} = \int (P_{FAULT} - P_{DECAY}) dt \quad \text{(Eq. 3)}$$

wherein:
$E_{ARCFAULT}$ and all intermediate integration values are greater than or equal to zero; and
$P_{DECAY}$ is a constant (e.g., a predetermined value; a proportional decay rate (e.g., a predetermined value, such as a decay time constant, 1/τ, times $E_{ARCFAULT}$ itself)).

As an example, an arc may provide an energy of 10 J/ms, with a decay imposed of 1 J/ms. This provides a net accumulation of 9 J/ms toward, say, a 100 J threshold. If the arc ceases at an accumulated value of 90 J, then the value will decay to zero in 90 ms representing the "memory" of the event, which is sort of a cooling rate. In a proportional decay with a time constant of 50 ms, for example, the arc must accumulate at a rate greater than the decay rate to reach the threshold; when the arc ceases, the accumulated value exponentially decays toward zero. In the case of a constant arc power of, for example, 1 kW with a decay rate of 50 ms, the equilibrium $E_{ARCFAULT}$ will be 50 J, which would be below the 100 J threshold, and would not trip. A constant value of $P_{DECAY}$ might be employed in a microprocessor since subtracting a value during each time step is straightforward (as compared to proportional decay). A proportional (exponential) decay may advantageously by employed in an analog implementation using an RC time constant.

As shown in FIG. 2, the μP 26' includes routines 42, 44 and 46, which implement Equations 1, 2 and 3, respectively, although only one of Equations 2 and 3 needs to be employed. The output 48 of the routine 46 includes the accumulated arc fault energy 36, $E_{ARCFAULT}$. The routines 42,46 determine the value of the arc fault energy 36 from both of the value of load voltage 30, $V_{LOAD}$, and the value of source current 4, $I_{SOURCE}$. Preferably, the routine 46 sets any negative value of the intermediate integration values or the final accumulated arc fault energy 36 of Equation 3 to zero. For example, the routine 46 employs a suitable constant value as the decay rate, $P_{DECAY}$. Alternatively, the μP 26" of FIG. 3 may employ a value proportional to the arc power $P_{FAULT}$ as the decay rate, $P_{DECAY}$, in determining the accumulated arc fault energy 36', $E_{ARCFAULT}'$.

Equations 4 and 5, below, determine the parallel arc fault location 12, L:

$$R_{FAULT} = (V_{SOURCE} - V_{LOAD})/I_{SOURCE} \quad \text{(Eq. 4)}$$

$$L = R_{FAULT}/\tau_{SPEC} \quad \text{(Eq. 5)}$$

wherein:
$V_{SOURCE}$ is the predetermined value 47 (FIG. 1), $V_{SOURCERATED}$; or a measured value 47' (FIG. 2), $V_{SOURCEMEASURED}$, of the upstream power source voltage 28; or a calculated value based upon a measured or predetermined nominal source voltage, source internal resistance (e.g., a nominal value; a value measured by a battery monitor) and the measured upstream power source current 4; in the latter case, the calculated value of the source voltage 28 is obtained from the difference of the nominal source voltage less the product of the source internal resistance and the measured upstream power source current 4;

$V_{LOAD}$ is the measured and communicated downstream load voltage value 30, which closely approximates the parallel arc voltage;

$I_{SOURCE}$ is the measured upstream power source current 4 including the fault current 6 and the load current 8;

$R_{FAULT}$ is resistance between the power source 16 and the parallel arc fault 2 in the power circuit 14; and $\tau_{SPEC}$ is predetermined resistance per unit length for the power circuit 14.

As an alternative to Equation 4, above, the resistance of connectors in the power circuit 14 may be accounted for as shown by Equation 4A.

$$R_{FAULT} = R_{CONN}(L) + (V_{SOURCE} - V_{LOAD})/I_{SOURCE} \quad \text{(Eq. 4A)}$$

wherein:
$R_{CONN}(L)$ is a predetermined nominal resistance of power circuit connectors up to length L as calculated without connectors (e.g., employing an iteration technique). For example, first employ Equations 4 and 5 to determine the location L. Then, obtain the predetermined value of $R_{CONN}(L)$ using that value of L. Then, recalculate the location L from Equations 4A and 5. Finally, repeat Equations 4A and 5 for a suitable count (e.g., until the result converges to within a suitable tolerance (e.g., a suitable distance in order to permit identification of the fault location and correction of the same; a few feet; a few inches) from one iteration to the next) of iterations.

As shown in FIG. 1, the μP 26 includes routines 49 and 50, which implement Equations 4 (or 4A) and 5, respectively.

The information on arc activity (Equations 2 or 3), whether a threshold is exceeded, and fault location (Equations 4 (or 4A) and 5) may be communicated to a local or remote protection module (e.g., the circuit breaker 32 of FIG. 2 or other suitable protection apparatus), in order to open and, thus, protect the power circuits 14', 14". Alternatively, the apparatus 10,10',10" may simply collect and/or display the arc fault energy 36 and/or the location 12.

Figure 4:
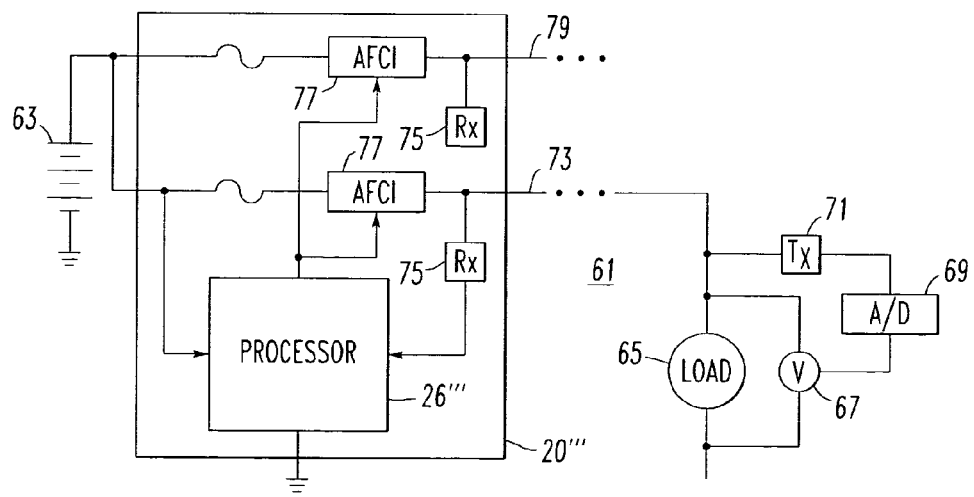
FIG. 4 is a block diagram in schematic form of an apparatus for sensing and communicating load voltage from the load to a power control module in accordance with another embodiment of the present invention.

FIG. 4 shows another power circuit 61 including a DC power source 63 and a DC load 65. The voltage 67 across the load 65 is sensed locally, converted to a digital signal by an analog-to-digital (A/D) converter 69, and employed to modulate a carrier by the transmitter 71 for transmission over a branch circuit 73 to a power control module 20''' where it is demodulated by a receiver 75 and provided to processor 26'''. Similar to the μP 26" of FIG. 3, the processor 26''' may employ the demodulated voltage and other information in determining whether to actuate a switch 77 for the branch circuit 73. This switch 77 can be, for instance, an arc fault current interrupter, which also provides protection for parallel arcs. As the processor 26''' is in the power control module 20''', it is in a position to provide arc fault protection for all of the branch circuits, such as 73,79, by employing a separate downstream voltage sensor (not shown) for each parallel branch.

Figure 5:
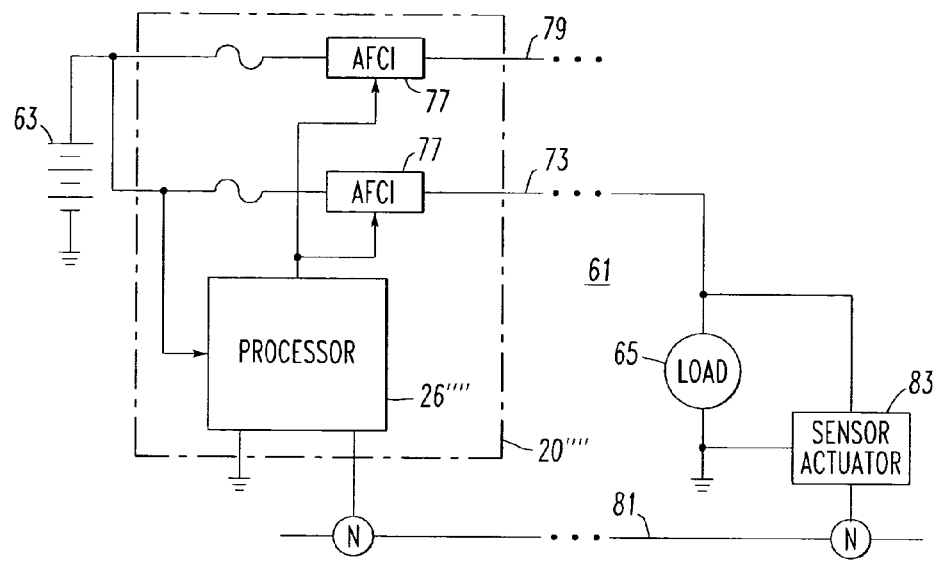
FIG. 5 is a block diagram in schematic form of an apparatus for sensing and communicating load voltage from the load to a power control module in accordance with another embodiment of the present invention.

As an alternative to communication between the load 65 and the power control module 20''' using a carrier signal on the branch circuit 73, in applications where a multiplexed system is available, the information from the power control module 20'''' or from the load 65 can be communicated in a packet on a communications bus 81, typically through a sensor/actuator chip 83 as shown in FIG. 5, or other suitable medium, such as wireless communication (FIG. 1), could be used.

Figure 6:
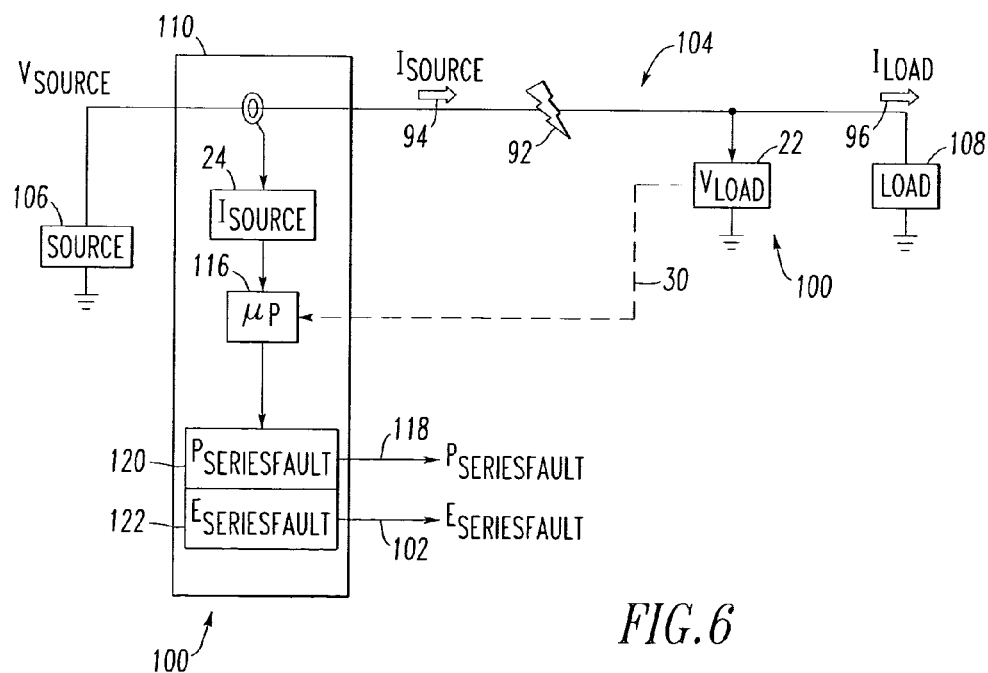
FIG. 6 is a block diagram in schematic form of an apparatus for a series arc fault in a power circuit in accordance with the present invention.

Referring to FIG. 6, for series arc faults, such as 92, the upstream source current 94, $I_{SOURCE}$, is the same as the downstream load current 96, $I_{LOAD}$. An apparatus 100 determines the series arc fault energy 102, $E_{SERIESFAULT}$, of the series arc 92 for a power circuit 104 between a power source 106 and a load 108 in real time. The apparatus 100 includes a detection module 110 and the remote load voltage sensor 22, which measures a value 30 of voltage, $V_{LOAD}$, at the load 108. The detection module 110 includes the source current sensor 24, which measures a value of the source current 94 flowing in the power circuit 104 to or from the power source 106 (e.g., an AC or DC power source), and a suitable processor, such as microprocessor (μP) 116.

Unlike parallel arc faults, for series arc faults, the fault voltage is in series with the power circuit resistance. Hence, a different method for determining energy, as contrasted with the method of FIG. 1, is employed. Equation 6 shows the determination of series arc power 118, $P_{SERIESFAULT}$, by routine 120 of FIG. 6:

$$P_{SERIESFAULT} = (V_{SOURCE} - V_{LOAD}) \times I_{SOURCE} \quad \text{(Eq. 6)}$$

wherein:

$V_{SOURCE} - V_{LOAD}$ is assumed to be the arc voltage, which greatly exceeds the other voltage drop in the power circuit 104 caused by power circuit impedance.

Similar to Equation 3, as discussed below in connection with Equation 7, the μP 116 employs another routine 122 to calculate the series arc fault energy 102, $E_{SERIESFAULT}$. Here, the routine 122 determines the value of the series arc fault energy 102, $E_{SERIESFAULT}$, from both of the value of load voltage 30, $V_{LOAD}$, and the value of source current 94, $I_{SOURCE}$.

Equation 7, below, is suitable for use with Equation 6, in order to determine the arc fault energy for the series arc fault, $E_{SERIESFAULT}$.

$$E_{SERIESFAULT} = \int (P_{SERIESFAULT} - P_{DECAY}) dt \quad \text{(Eq. 7)}$$

wherein:

$P_{DECAY}$, once again, as in the parallel case, can be applied using a constant or proportional rate, as was discussed above.

Figure 7:
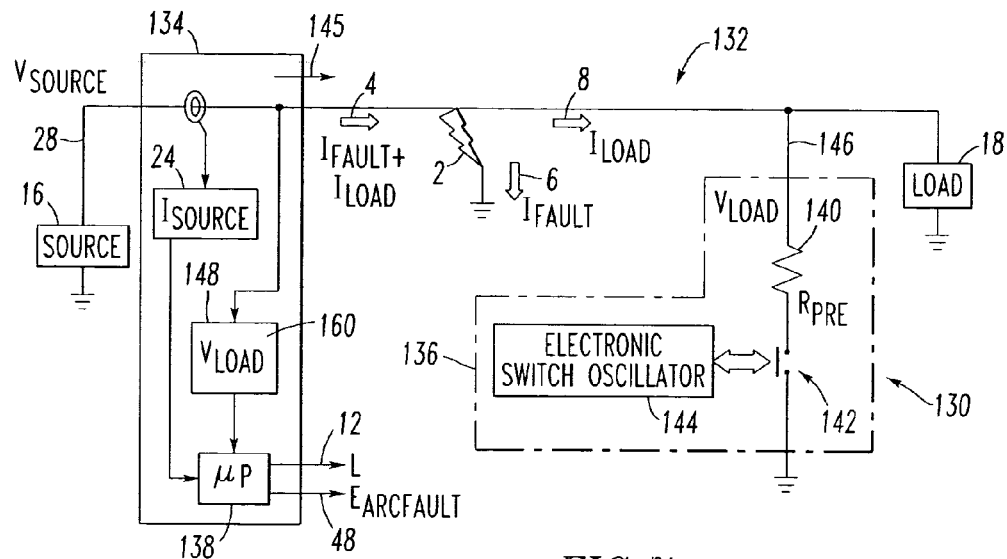
FIG. 7 is a block diagram in schematic form of an apparatus for sensing and communicating load voltage from the load to a detection module in accordance with another embodiment of the present invention.

FIG. 7 shows another apparatus 130 for a power circuit 132 between the power source 16 and the load 18. The apparatus 130 includes a detection module 134 and a remote load voltage sensor 136, which measures a value of voltage, $V_{LOAD}$, at the load 18. The detection module 134 includes the source current sensor 24, which measures a value of the source current 4 flowing in the power circuit 132 to or from the power source 16 (e.g., an AC or DC power source), and a suitable processor, such as microprocessor (μP) 138. In a similar manner, as discussed above in connection with FIGS. 1 and 2, the μP 138 determines the location 12 (L) and the energy 48 ($E_{ARCFAULT}$) of the parallel arc fault 2. The remote load voltage sensor 136 includes a suitable precision switched resistor 140 having a resistance, $R_{PRE}$, a switch 142, and an electronic switch oscillator 144, which encodes the load voltage as a current 145 through a power line carrier current signal 146. The detection module 134 also includes a demodulator 148, which demodulates the current 145, $I_{DEMODULATED}$, from the power circuit 132, and which, thus, decodes the load voltage, $V_{LOAD}$, from Equation 8, assuming that the switch 142 has a suitably low impedance.

$$V_{LOAD} = I_{DEMODULATED} \times R_{PRE} \quad \text{(Eq. 8)}$$

wherein:

$I_{DEMODULATED}$ is the current 145 (amps) introduced by the load voltage sensor 136; and $R_{PRE}$ is the resistance (ohms) of the precision resistor 140.

The switched precision resistor 140 is preferably employed because of its relatively low cost and its ability to encode the downstream load voltage, $V_{LOAD}$, into a relatively small current 145 that rides on top of the load current 8.

Figure 8:
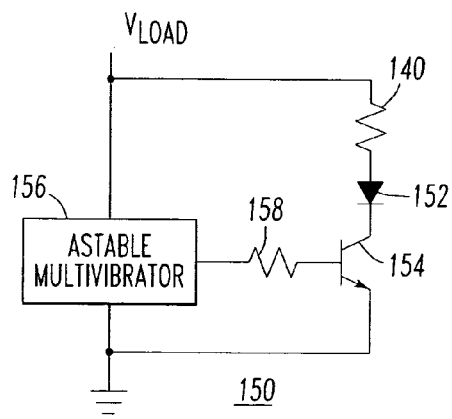
FIG. 8 is a block diagram in schematic form of modulator circuit for communicating load voltage from the load in accordance with another embodiment of the present invention.

One method to achieve the switching of FIG. 7 is shown by the circuit 150 of FIG. 8. The circuit 150 includes the precision resistor 140, an optional diode 152, a suitable switch, such as an NPN transistor 154, an astable multivibrator 156 and a resistor 158. The diode 152 is electrically connected in series with the resistor 140 and the transistor 154. The multivibrator 156 (e.g., a 555 timer having a square wave output at a suitable selected frequency and duty cycle) is powered from the load voltage, $V_{LOAD}$, and drives the base of the transistor 154 through the resistor 158 at a suitable predetermined frequency. The series combination of the resistor 140, diode 152 and transistor 154 is electrically connected between the power circuit and ground (e.g., across the load 18 of FIG. 7) in order to switch the current 145 at the predetermined frequency in the power circuit 132. The switched current 145 is representative of the measured value of voltage, $V_{LOAD}$, at the load 18, as shown by Equation 8. The selected frequency (e.g., without limitation, a few kHz) preferably has a cycle time (period) less than the desired measurement rate at the source end (e.g., at the detection module 134 of FIG. 7). The demodulator 148 of FIG. 7 includes a circuit 160 decoding the switched current 145 at the predetermined frequency in the power circuit 132 and representative of the measured value of voltage, $V_{LOAD}$, at the load 18 in order to determine such measured value of voltage.

Figure 9:
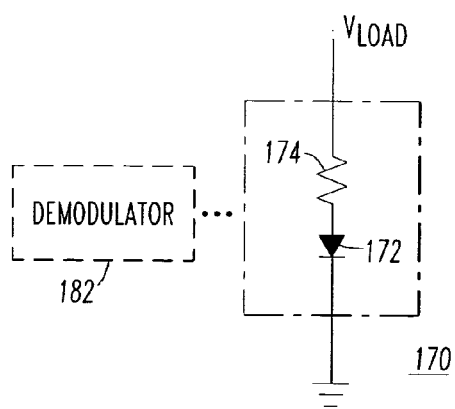
FIG. 9 is a block diagram in schematic form of another circuit for communicating load voltage from the load in accordance with another embodiment of the present invention.

Referring to FIG. 9, another remote load voltage sensor or circuit 170 is shown. The sensor 170 includes the series combination of a diode 172 electrically connected with a suitable precision resistor 174. This series combination may then be electrically connected between the power circuit and ground (e.g., across the load 18 of FIG. 7). This provides a relatively low cost sensing method, albeit relatively much slower than the circuit 150 of FIG. 8 and the circuit 160 of FIG. 7, for an AC power source. In essence, the circuit 170 is the same circuit as shown in FIG. 8, excluding the multivibrator 156, resistor 158 and transistor 154.

Figure 10:
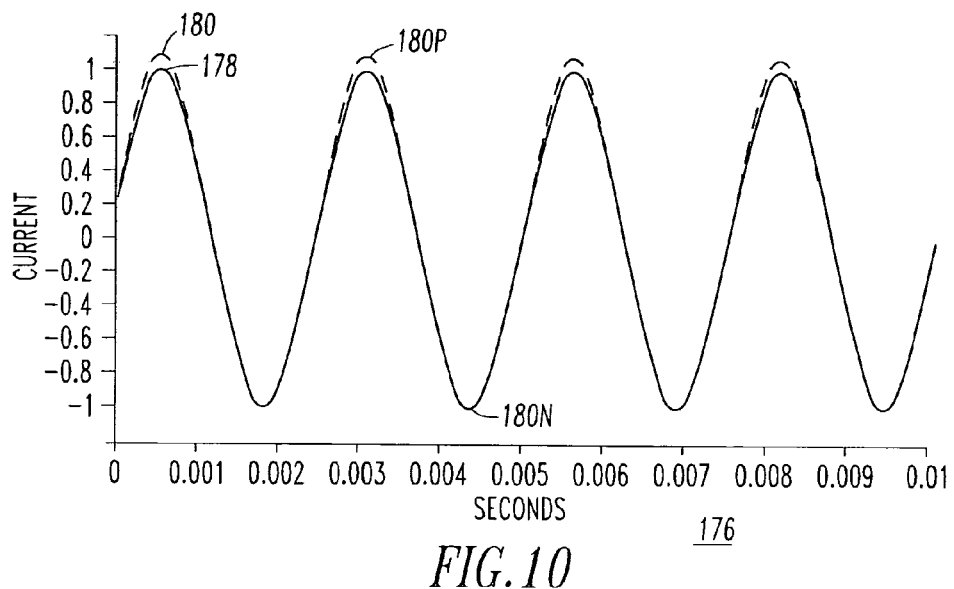
FIG. 10 is a plot of current versus time for the circuit of FIG. 9.

FIG. 10 shows a plot 176 of currents 178,180 versus time for the sensor 170 of FIG. 9. The current 178 is the load current 8, $I_{LOAD}$, of FIG. 7. The current 180 is that load current 8 plus the current from the sensor 170. A corresponding demodulator circuit 182 of FIG. 9 may either: (1) add the positive response 180P of the source frequency positive half cycle source current to the negative response 180N of the negative half cycle source current, in order to extract the current from the sensor 170; or (2) otherwise suitably extract the ½*source frequency sub-harmonic from the current 180. Due to the reduced response time with respect to the circuit 150 of FIG. 8, the circuits 170,182 of FIG. 9 are most applicable to relatively more continuous series arcs that persist over relatively many line cycles.

Figure 11:
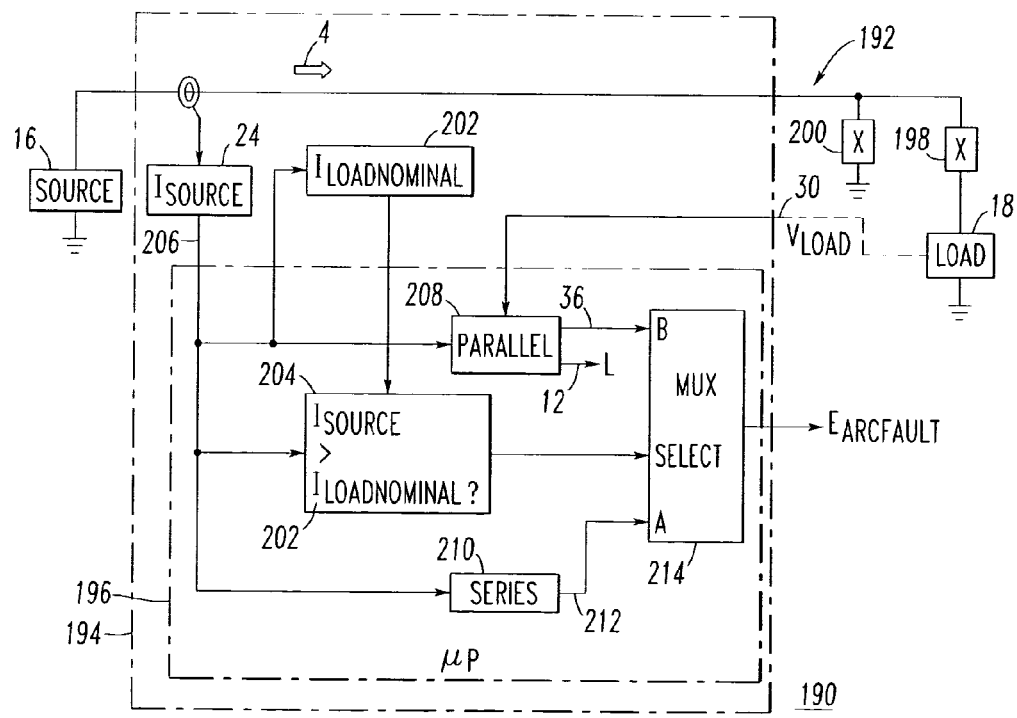
FIG. 11 is a block diagram of a detection module for parallel and series arcs in accordance with another embodiment of the invention.

Referring to FIG. 11, an apparatus 190 is employed with a power circuit 192. The apparatus 190 includes a detection module 194 and a remote load voltage sensor, such as 22 of FIG. 1, which measures a value 30 of voltage, $V_{LOAD}$, at a load, such as 18. The detection module 194 also includes the source current sensor 24, which measures a value of the source current 4 flowing in the power circuit 192 to or from the power source 16 (e.g., an AC or DC power source), and a suitable processor, such as microprocessor (µP) 196.

In accordance with the invention, the µP 196 determines which equations to apply for a series arc (passive load case), such as 198 (e.g., Equations 6–7), or a parallel arc, such as 200 (Equations 1–5). The apparatus 190, thus, distinguishes a parallel arc from a series arc for the power circuit 192 between the power source 16 and the load 18. The determination is made by, first, providing a nominal value of current 202, $I_{LOADNOMINAL}$, flowing in the power circuit 192 between the power source 16 and the load 18. This nominal value may be obtained from known load characteristics.

An appropriate "dead zone" margin between series and parallel arcs is preferably applied, in order to avoid normal variations due to mechanical loading, temperature, or other effects. Inrush and transients are only avoided by: (1) knowing, through a suitable communication mechanism, when such transients are occurring; (2) providing a signature discrimination mechanism that prevents accumulation of arc energy during "normal" transients, including turn-on; and (3) ensuring that the arc thresholds are above arc energies accumulated during transients and startups.

Second, at 204, a parallel arc, such as 200, is identified when the measured value 206 of the source current 4 is greater than the nominal value of current 202, $I_{LOADNOMINAL}$, often providing a suitable margin, for example, $2 \times I_{LOADNOMINAL}$. Otherwise, a series arc, such as 198, is identified when the measured value 206 of the source current (e.g., ×150%, in order to provide suitable margin) is less than the nominal value of load current 202 (which is assumed to be a passive load). Thus, the apparatus 190 determines whether the fault current, as estimated by the source current 4, $I_{SOURCE}$, is suitably less than (for series arcs) or suitably greater than (for parallel arcs) the nominal load current 202, thereby providing a "dead zone" margin, where necessary, in order to account for normal variations associated with the specific load.

The µP 196 further includes a first routine 208, which implements Equations 1-5, and a second routine 210, which implements Equations 6-7. The first routine 208 outputs the accumulated arc fault energy 36, $E_{ARCFAULT}$, and the location 12 (L). The second routine 210 outputs the accumulated arc fault energy 212, $E_{SERIESFAULT}$. The µP 196 employs a predetermined value of voltage, $V_{SOURCERATED}$, at the power source 16.

The µP 196 also includes a multiplexer function 214, which employs the output of the function 204 to determine (if true) to output the accumulated parallel arc fault energy 36, $E_{ARCFAULT}$, or (if false) to output the accumulated series arc fault energy 212, $E_{SERIESFAULT}$. Also, when the output of the function 204 is true, the location of the parallel arc fault 200 is provided by the location 12 (L).

Figure 12:
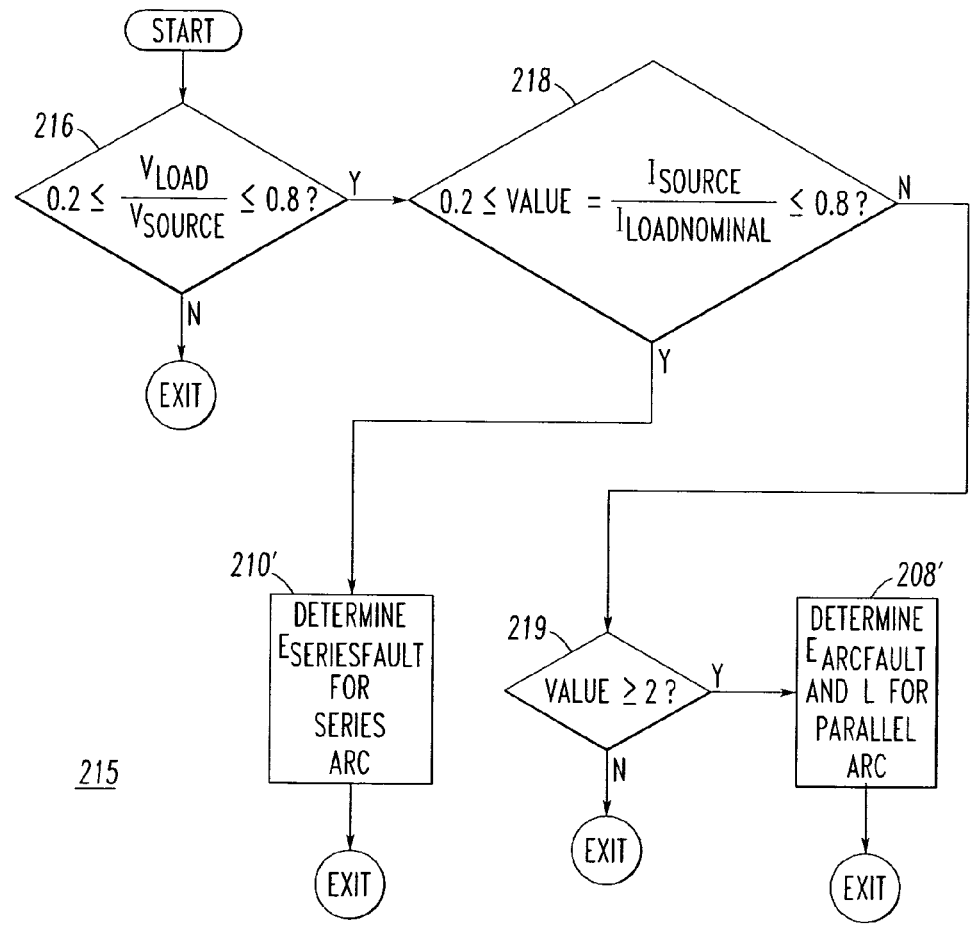
FIG. 12 is a flowchart for a detection module, similar to that of FIG. 11, in accordance with another embodiment of the invention.

FIG. 12 shows a flowchart for use by a detection module 215, which is similar to the detection module 194 of FIG. 11. This routine determines whether an arc exists and, if so, which type of arc (i.e., parallel or series) exists. For example, a series arc sets the load voltage to the source voltage minus the arc voltage, and a parallel arc sets the load voltage to the arc voltage. However, the arc voltage can vary from about 20% to about 80% of the source voltage, thereby preventing this from being the sole criterion. Step 216 initially determines whether there is a series arc or a parallel arc by determining whether the ratio of the load voltage, $V_{LOAD}$, divided by the source voltage, $V_{SOURCE}$, is greater than or equal to a first value (e.g., 0.2) and is less than or equal to a second value (e.g., 0.8). For example, the range in this example is about 0.2 to about 0.8. As another example, if there is a series arc and the arc voltage is about 20%–80% of the source voltage, then the load voltage will be about 80%–20% of the source voltage. Also, if there is a parallel arc and the arc voltage is about 20%–80% of the source voltage, then the load voltage will be about 20%–80% of the source voltage. Hence, step 216 verifies the existence of a parallel or series arc. If that test is false, then a series arc or a parallel arc cannot reliably be determined, and the routine exits.

Otherwise, steps 208' and 210' implement, similar to routines 208 and 210 of FIG. 11, Equations 1–5 and Equations 6–7, respectively. Prior to those steps, step 218 determines a series arc, such as 198 of FIG. 11, when the ratio of the measured value 206 of the source current 4, $I_{SOURCE}$, and the nominal value of current 202, $I_{LOADNOMINAL}$, is less than or equal to a first predetermined value (e.g., 0.8). Preferably, that value (VALUE) from step 218 is also greater than another predetermined value (e.g., 0.2). If so, then execution resumes at step 210', which determines the series arc energy. Otherwise, at 219, it is determined whether the value (VALUE) from step 218 is greater than or equal to a second predetermined value (e.g., 2.0). If so, then a parallel arc, such as 200 of FIG. 11, is identified and execution resumes at step 208'. Otherwise, the routine exits. In this example, nuisance tripping is minimized by not determining an arc when the value of steps 218 and 219 is greater than about 0.8 and is less than about 2.0.

Steps 218 and 219 are not intended to be applied to turn on or step load change transients.

An active load may cause the source current to be forced into a "dead zone," or at least not provide a decrease in current that is usually expected, thereby making arc detection indeterminate.

It will be appreciated that the values 0.2, 0.8 and 2.0 are examples, and that a range of other suitable values may be employed.

It is possible to distinguish arcing from load variations due to mechanical loading or temperature changes based on the "rapidity" or rate of change (e.g., greater for arcing) or from the presence of "high frequency steps", by employing the current "just before" the current change rather than the so called "nominal" current.

For parallel arcs in which $I_{SOURCE}$ is greater than $I_{LOAD-NOMINAL}$, correction for ohmic drop in the power circuit, such as 192 of FIG. 11, may be provided by Equations 9–14, below.

$$V_{SOURCE} = V_{LINETOARC} + V_{ARCTOLOAD} + V_{LOAD} \quad \text{(Eq. 9)}$$

$$V_{LINETOARC} = I_{SOURCE} \times L_{LINETOARC} \times RES_L \quad \text{(Eq. 10)}$$

$$V_{ARCTOLOAD} = I_{LOADNOMINAL} \times L_{ARCTOLOAD} \times RES_L \quad \text{(Eq. 11)}$$

$$L_{TOTAL} = L_{LINETOARC} + L_{ARCTOLOAD} \quad \text{(Eq. 12)}$$

$$V_{SOURCE} \approx I_{SOURCE} \times L_{LINETOARC} \times RES_L + I_{LOADNOMINAL} \times (L_{TOTAL} - L_{LINETOARC}) \times RES_L + V_{LOAD} \quad \text{(Eq. 13)}$$

$$L_{LINETOARC} \approx (V_{SOURCE} - V_{LOAD} - I_{LOADNOMINAL} \times L_{TOTAL} \times RES_L) / ((I_{SOURCE} - I_{LOADNOMINAL}) \times RES_L) \quad \text{(Eq. 14)}$$

wherein:

$V_{SOURCE}$, as defined above, is one of nominal, calculated or measured source voltage;

$V_{LINETOARC}$ is the voltage between the voltage source and the parallel arc fault;

$V_{ARCTOLOAD}$ is the voltage between the parallel arc fault and the load;

$V_{LOAD}$, as defined above, is measured at or suitably near the load;

$RES_L$ is resistance per unit length for the power circuit;

$L_{TOTAL}$ is the total predetermined length of the power circuit from the voltage source to the load;

$L_{LINETOARC}$ is the calculated total length from the voltage source to the parallel arc fault; and $L_{ARCTOLOAD}$ is the total length from the parallel arc fault to the load.

In the event that there are multiple power conduits connected in series in the power circuit between the power source and the load, which power conduits have different resistivities, or which have connector resistances specifically and individually located therein, then a more complex equation than Equation 14 involving zones governed by inequalities may be provided by one of ordinary skill in the art.

Although microprocessor-based apparatus are disclosed, the invention is applicable to a wide range of analog and/or digital and/or processor based apparatus, systems and methods.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An apparatus for determining parallel arc fault energy in real time for a power circuit between a power source and a load, said apparatus comprising:
   means for determining a value of voltage at said load;
   means for determining a value of current flowing in said power circuit to or from said power source; and
   means for determining a value of said parallel arc fault energy from said value of voltage at said load and said value of current.

2. The apparatus of claim 1 wherein said means for determining a value of said parallel arc fault energy includes means for determining a value of voltage at said power source.

3. The apparatus of claim 2 wherein said means for determining a value of voltage at said power source includes a predetermined value of voltage at said power source.

4. The apparatus of claim 2 wherein said means for determining a value of voltage at said load includes means for remotely communicating said value of voltage at said load to said means for determining a value of said parallel arc fault energy.

5. The apparatus of claim 1 wherein said means for determining a value of said parallel arc fault energy includes means for determining a value of parallel arc power from said value of voltage at said load times said value of current, and means for determining said value of said parallel arc fault energy as a function of an integral of said parallel arc power.

6. The apparatus of claim 1 wherein said means for determining a value of voltage at said load includes means for remotely communicating said value of voltage at said load by encoding said value of voltage through a power line carrier signal to said means for determining a value of said parallel arc fault energy.

7. The apparatus of claim 1 wherein said means for determining a value of voltage at said load includes means for remotely communicating said value of voltage at said load by encoding said value of voltage as a current through a power line carrier current signal to said means for determining a value of said parallel arc fault energy.

8. An apparatus for determining arc fault energy in real time for a power circuit between a power source and a load, said apparatus comprising:
   means for determining a value of voltage at said load;
   means for determining a value of current flowing in said power circuit to or from said power source;
   means for determining a value of said arc fault energy from said value of voltage and said value of current,
   wherein said means for determining a value of said arc fault energy includes means for determining a value of parallel arc power from said value of voltage at said load times said value of current, and means for determining said value of said arc fault energy as a function of an integral of said parallel arc power, and
   wherein said means for determining said value of said arc fault energy as a function of an integral of said parallel arc power includes means for integrating a difference of said parallel arc power less a decay rate.

9. The apparatus of claim 8 wherein said means for integrating includes a constant value as said decay rate.

10. The apparatus of claim 8 wherein said means for integrating includes a value proportional to said arc power as said decay rate.

11. The apparatus of claim 8 wherein said means for integrating includes an output for said arc fault energy, a plurality of intermediate integration values, and means for setting any negative value of said arc fault energy and said intermediate integration values to zero.

12. A method for determining parallel arc fault energy in real time for a power circuit between a power source and a load, said method comprising:
determining a value of voltage at said load;
determining a value of current flowing in said power circuit to or from said power source; and
determining a value of said parallel arc fault energy from said value of voltage at said load and said value of current.

13. A method for determining arc fault energy in real time for a power circuit between a power source and a load, said method comprising:
determining a value of voltage at said load;
determining a value of current flowing in said power circuit to or from said power source;
determining a value of said arc fault energy from said value of voltage and said value of current;
determining a value of parallel arc power from said value of voltage times said value of current; and
determining said value of said arc fault energy as a function of an integral of said parallel arc power less a decay rate.

14. The method of claim 13 further comprising:
employing one of a value proportional to said parallel arc power and a constant value as said decay rate.

15. The method of claim 13 further comprising:
determining a plurality of intermediate integration values before outputting said arc fault energy; and
setting any negative value of said arc fault energy and said intermediate integration values to zero.

16. An apparatus for determining a location of a parallel arc for a power circuit between a power source and a load in real time, said apparatus comprising:
means for providing a value of voltage from said power source;
means for measuring a value of current flowing in said power circuit to or from said power source;
means for measuring a value of voltage at said load; and
means for determining said location from said value of voltage from said power source, said value of current, said value of voltage at said load, and a wire resistance per unit length or a wire conductance per unit length of said power circuit.

17. The apparatus of claim 16 wherein said means for measuring a value of voltage at said load includes a first circuit encoding said value of voltage at said load on a power line carrier; and wherein said means for determining said location includes a second circuit decoding said value of voltage at said load from said power line carrier.

18. The apparatus of claim 17 wherein said first circuit includes a series combination of a switch and a resistor electrically connected in series with said switch, and a third circuit driving said switch at a predetermined frequency, said series combination being electrically connected between said power circuit and a ground in order to switch a current at said predetermined frequency in said power circuit, said switched current being representative of said measured value of voltage at said load; and wherein said second circuit includes a fourth circuit decoding said switched current at said predetermined frequency in said power circuit and representative of said measured value of voltage at said load in order to determine said measured value of voltage.

19. The apparatus of claim 18 wherein said third circuit is a multivibrator, and wherein said switch is a transistor driven by said multivibrator.

20. The apparatus of claim 17 wherein said first circuit includes a series combination of a diode electrically connected in series with a resistor, said series combination being electrically connected between said power circuit and a ground.

21. The apparatus of claim 18 wherein said first circuit further includes a diode electrically connected in series with said resistor and said switch.

22. The apparatus of claim 16 wherein said means for measuring a value of voltage at said load includes a first circuit sending said value of voltage at said load on a communication channel; and wherein said means for determining said location includes a second circuit receiving said value of voltage at said load from said communication channel.

23. The apparatus of claim 22 wherein said communication channel is a wireless media.

24. The apparatus of claim 16 wherein said means for determining said location includes a processor determining said location from a difference of said value of voltage from said power source less said value of voltage at said load, said difference being divided by said value of current and being divided by said wire resistance per unit length.

25. The apparatus of claim 24 wherein said processor employs a predetermined source voltage as said value of voltage from said power source.

26. The apparatus of claim 16 wherein said means for determining includes means for adjusting said location based upon a resistance of connectors in said power circuit.

27. A method for determining parallel arc location in real time for a power circuit between a power source and a load, said method comprising:
providing a value of voltage from said power source;
measuring a value of current flowing in said power circuit to or from said power source;
measuring a value of voltage at said load; and
determining said parallel arc location from said value of voltage from said power source, said value of current, said value of voltage at said load, and a wire resistance per unit length or a wire conductance per unit length of said power circuit.

28. The method of claim 27 further comprising:
employing a predetermined source voltage as said value of voltage from said power source.

29. The method of claim 27 further comprising:
measuring a source voltage as said value of voltage from said power source.

30. The method of claim 27 further comprising:
determining a difference of said value of voltage from said power source less said value of voltage at said load; and
dividing said difference by said value of current and by said wire resistance per unit length.

31. The method of claim 27 further comprising:
employing a total predetermined length of the power circuit from the power source to the load;
employing a nominal value of load current; and
determining said parallel arc location from said value of voltage from said power source, said value of current, said value of voltage at said load, said wire resistance per unit length or said wire conductance per unit length of said power circuit, said total predetermined length of the power circuit from the power source to the load, and said nominal value of load current.

* * * * *

UNITED STATES PATENT AND TRADEMARK OFFICE
CERTIFICATE OF CORRECTION

PATENT NO. : 7,068,045 B2  
APPLICATION NO. : 10/627016  
DATED : June 27, 2006  
INVENTOR(S) : Joseph C. Zuercher et al.

Page 1 of 1

It is certified that error appears in the above-identified patent and that said Letters Patent is hereby corrected as shown below:

Title Page, Column 1, item (73) Assignee, "Gaton" should read --Eaton--.

Signed and Sealed this  
Twelfth Day of February, 2013

Teresa Stanek Rea  
*Acting Director of the United States Patent and Trademark Office*